Aug. 29, 1961  J. R. URSCHEL ET AL  2,998,041
MACHINE FOR PROCESSING A FOOD PRODUCT
Filed May 23, 1956  4 Sheets-Sheet 1

INVENTORS
JOE. R. URSCHEL
GERALD W. URSCHEL
BY
Charles S. Penfold
ATTORNEY

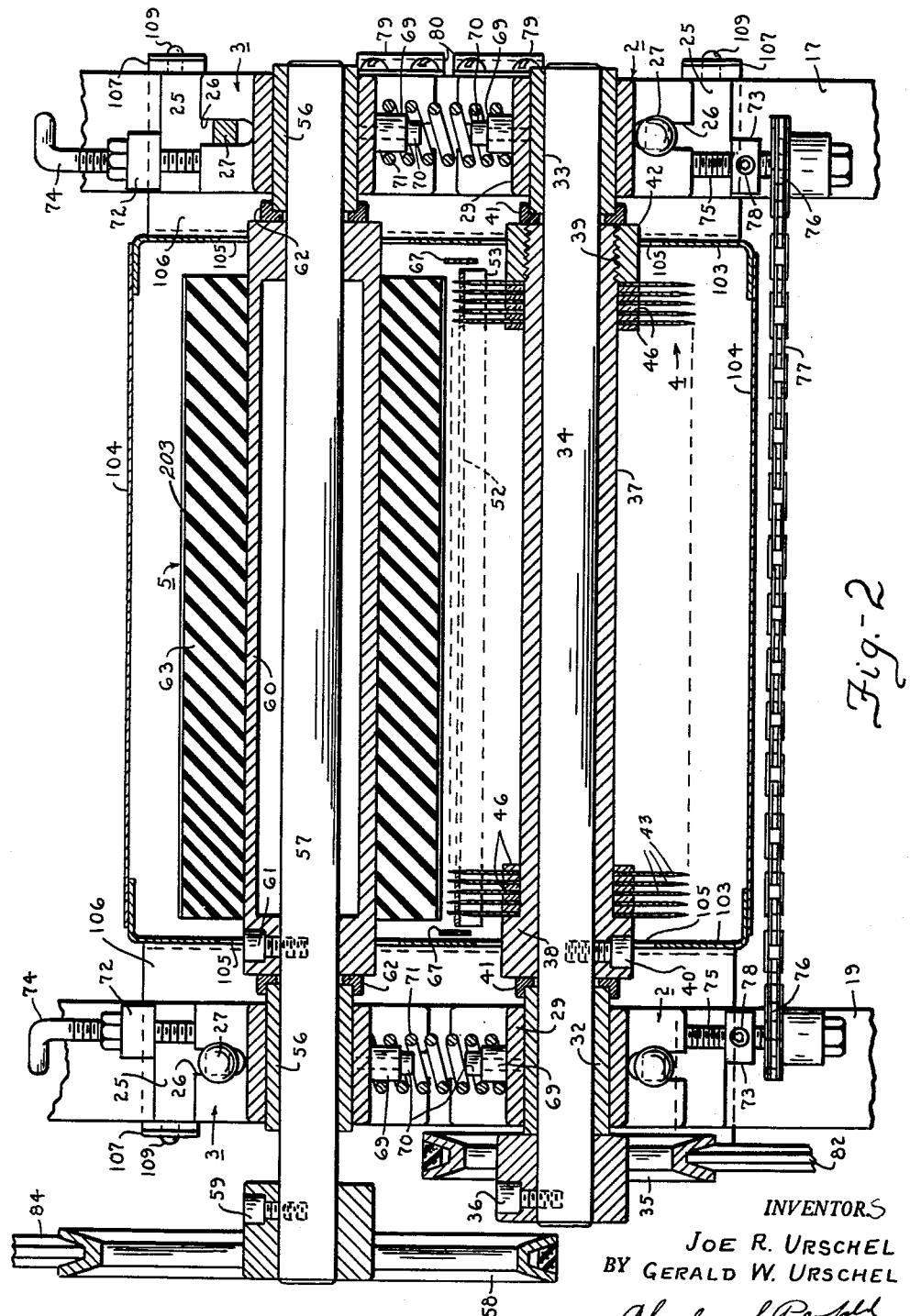

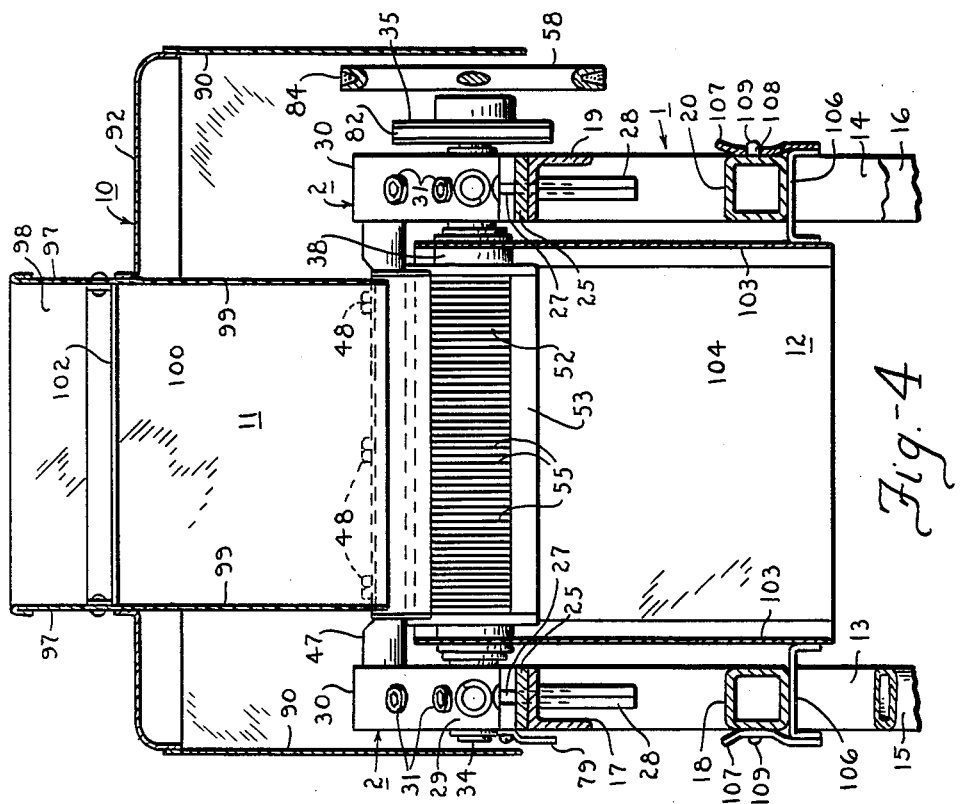
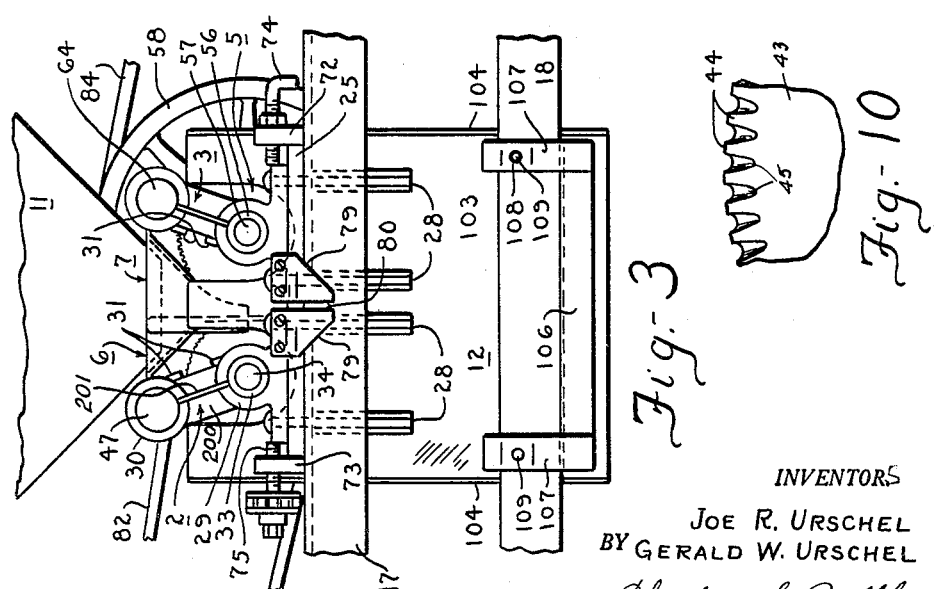

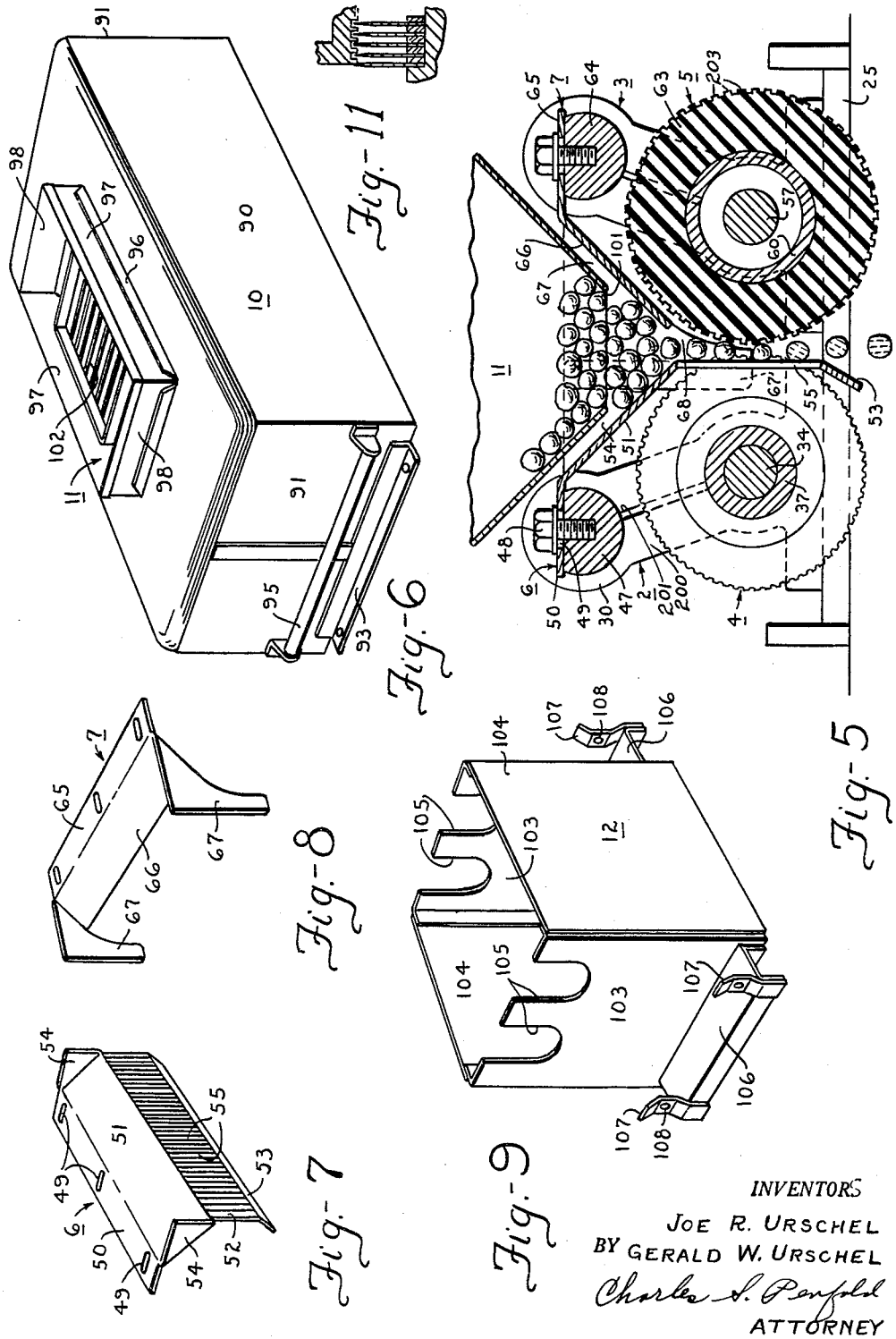

es Patent Office 2,998,041
Patented Aug. 29, 1961

2,998,041
MACHINE FOR PROCESSING A FOOD PRODUCT
Joe R. Urschel and Gerald W. Urschel, both of Valparaiso, Ind.
Filed May 23, 1956, Ser. No. 586,786
15 Claims. (Cl. 146—56)

The invention relates generally to equipment for processing or conditioning food products for consumption, and more particularly is directed to a machine and process whereby the covers on a variety of products such as peas, cranberries and coffee beans are scarified, penetrated or cut.

Some food products in their natural state, for example, peas, are protected by a thin cover or skin which is relatively tough and impervious to water. When the peas are in a dried condition the covers become quite hard or brittle so that considerable additional time is required in cooking or preparing them for human consumption.

With the foregoing in mind, the principal object of the invention is to provide a machine, embodying improved principles of design and construction, whereby a product, such as peas, is conditioned for use by penetrating or cutting their skins or covers so that the cooking thereof can be materially expedited. In other words, providing one or a plurality of openings or weakening the skins at different locations affords a means whereby a cooking medium, such as boiling water, can readily obtain access to the meat or interior of the peas and thereby accelerate and promote a more uniform and thorough cooking action as distinguished from the conventional process now in commercial and domestic use. The invention also provides means whereby the covers of relatively fresh products, such as peas, can be penetrated in order to promote drying thereof and thereby reduce the size and weight to facilitate shipment and storage.

The machine employed for accomplishing the process or conditioning above referred to preferably includes a rotatable conditioner unit provided with elements and a rotatable feed roller unit which cooperate or coact with one another to direct a product therebetween for conditioning by the elements. More particularly in this regard, the conditioner elements are preferably made in the form of disc-like blades provided with teeth or serrated edges of a predetermined character for penetrating, cutting or weakening the cover of a product and the surface of the roller is preferably resilient and provided with a plurality of longitudinal corrugations or other suitable interruptions, to promote traction and resiliently urge or ease the products into the peripheral cutting edges of the elements. This utilization of teeth or serrated edges on the elements is important and offers the definite advantage of causing the cutting or knife-like edges to strike the products intermittently and penetrate their surfaces or covers more easily in contrast to smooth cutting edges which do not afford any appreciable impact against the products.

An important object of the invention s to provide a machine comprising, among other things, a stand provided with tracks, a pair of supports for the conditioner unit and a pair of supports for the feed roller unit, and means whereby to facilitate accurate relative positioning of the units by adjustment of the supports on the tracks.

A significant object of the invention is to provide an organization of the character above alluded to in which a pair of novel means are employed for adjusting the supports carrying the roller, and the adjustment of one means will simultaneously adjust both and thereby alleviate the necessity of selective adjustment thereof.

A specific object of the invention is to provide means for selectively locking the supports on the tracks after adjustment and locating said means for convenient manipulation.

Another object of the invention is to provide a setup whereby the units are preferably rotated at different speeds by power means preferably in the form of a pair of electric motors respectively operatively connected to the units so that the conditioner rotates at a somewhat higher speed or r.p.m. than the roller.

A particular object of the invention is to provide a cover for the machine for protecting the movable components thereof and combine with the cover a primary hopper and a grating device in the hopper so that an operator cannot readily reach into the hopper and get injured by the rotating parts.

Another object of the invention is to provide a machine in which the respective pairs of supports for the rotatable units are reenforced or stabilized by cross-bars and a pair of guides are respectively carried by the bars for the purpose of directing or funneling the products from the primary hopper for entry between the units. More particularly in this regard, the guides complement and cooperate with one another to form a secondary hopper which receives the lower extremity of the primary hopper.

Also, an object of the invention is to provide the guide associated with the conditioner unit with a plurality of openings or slots through which the peripheral cutting edges of the elements extend and so that portions of the guide are disposed between the elements to substantially prevent clogging or packing of the products or parts thereof between the elements. With this arrangement the depth of the penetration or cut into the products may be gauged and the portions of the guide between the elements will strip the products from the elements and assist in maintaining the elements in a clean condition.

An additional object of the invention is to provide improved means whereby the distance between the feed roller and the penetrating elements may be readily gauged or determined.

Another object of the invention is to provide a process for conditioning a food product having a cover, which consists in nicking the cover at a plurality of locations to provide access to the interior of the product.

A further object of the invention is to provide a machine of the character above referred to, including a chute which is detachably connected to the stand of the machine for receiving the discharged conditioned products.

Other attributes of the machine reside in its capacity to efficiently condition great quantities of products in a short period of time, durability, simplicity of operation and adjustment, and advantages with respect to manufacture and assembly.

Many other objects and advantages of the invention will become apparent after the description hereinafter set forth is considered in conjunction with the drawings annexed hereto.

In the drawings:

FIGURE 2 is an enlarged horizontal sectional view taken substantially on line 2—2 of FIGURE 1 for the purpose of illustrating the operative relationship of the product conditioner and feed roller, including means for affording relative adjustment therebetween;

FIGURE 3 is a partial elevational view, showing the manner in which supports, carrying the conditioner and roller, are mounted, including means utilized to detachably lock the supports in place after adjustment and means for gauging the distance between the conditioner and roller;

FIGURE 4 is a transverse vertical sectional view taken substantially on line 4—4 of FIGURE 1 exemplifying, among other things, certain details of construction and mode of detachably mounting a chute on the table of the machine;

FIGURE 5 is an enlarged partial view of the structure illustrated in FIGURE 1, and depicts in detail the relationship of the conditioner and roller, guides respectively associated therewith and the manner in which the products adapted to be conditioned or treated flow or pass through the machine from a hopper for discharge into the chute;

FIGURE 6 is a perspective view showing a cover for the upper part of the machine and the hopper carried by the cover;

FIGURE 7 is a perspective view of one of the guides which is carried by one of the supports;

FIGURE 8 is a perspective view of one of the other guides which is carried by one of the other supports;

FIGURE 9 is a perspective view of the chute;

FIGURE 10 is an enlarged partial view of one of the disc-like conditioner elements illustrating the character of its cutting edge; and FIGURE 11 is a partial sectional view depicting a transversely grooved roller with elements extending into the grooves.

Figure 1:
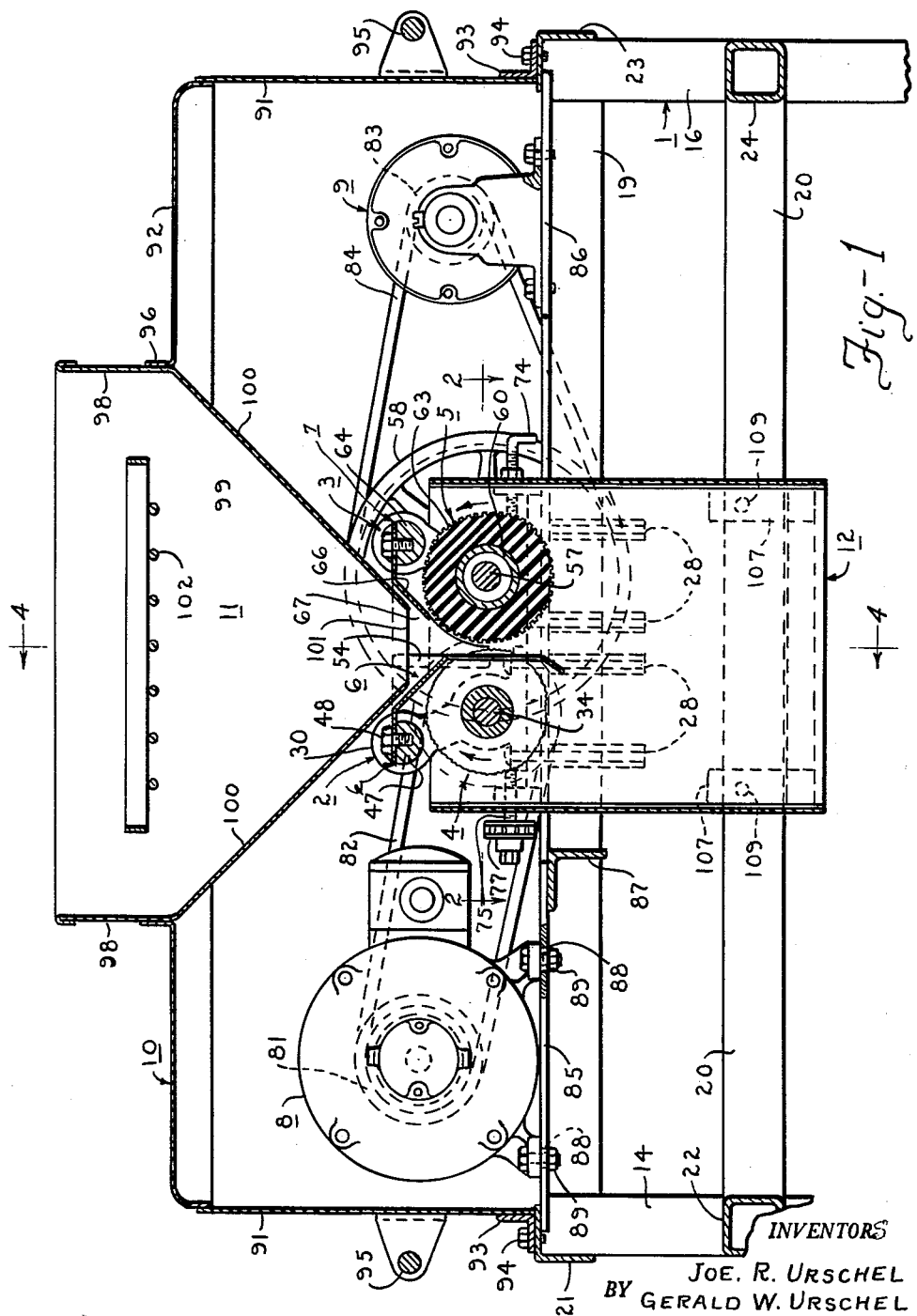
FIGURE 1 is a vertical sectional view of the machine illustrating, among other things, power means for operating a product conditioner unit and a feed roller unit.

Referring briefly to the components of the machine, numeral 1 generally designates a stand or table; 2 and 3 pairs of supports which respectively carry a conditioner unit 4 and a feed roller 5; 6 and 7 guides which are mounted on the supports for directing the products to be conditioned to the unit and rollers; 8 and 9 power means for respectively driving the unit and roller; 10 a cover carrying a primary hopper 11 for the products and 12 a chute through which the treated or conditioned products are discharged into a suitable container or receptacle (not shown).

The improved principles of design and construction embodied in the components of the machine will now be described in detail, substantially in the order above referred to.

The stand 1 may be designed and constructed in various ways, but as exemplified in the drawing, is preferably in the form of a rectangular framework and includes a pair of legs 13 and 14; a pair of legs 15 and 16; a pair of corresponding upper and lower side rails 17 and 18 joining the legs 13 and 15; a pair of corresponding upper and lower side rails 19 and 20 joining the legs 14 and 16; a pair of upper and lower end rails 21 and 22 joining the legs 13 and 14; and a pair of upper and lower end rails 23 and 24 joining the legs 15 and 16; all of the aforesaid providing a substantial mounting with its upper extremity forming a base for the majority of the components of the machine.

The pairs of supports 2 and 3, constituting supporting means, are mounted in a novel way on the stand and will now be described. Each of the upper side rails 17 and 19 of the stand is provided with a smooth track or way 25. These supports are slidably mounted on the tracks, and as shown, the supports 2 carry the product conditioner 4 and the supports 3 the feed roller 5 so that one of each of the pairs of supports 2 and 3 are aligned on one of the tracks.

Each of the supports includes an elongated base having ends provided with slots 26 as indicated in FIGURE 2. Bolts 27, as shown in FIGURES 2, 3 and 4 extend through the slots and through holes provided therefor in the tracks 25 and upper side rails 17 and 19 and elongated nuts 28, preferably of a sufficient length to depend appreciably below the upper rails for convenient manipulation, serve to firmly lock the supports in place after adjustment. The bolts have squared portions which register with the slots 26 so as to prevent the bolts from turning when the nuts are manipulated. If found desirable, the tracks and upper rails could be provided with slots in lieu of the slots in the bases of the supports to facilitate adjustment of the supports on the tracks.

Each of the pair of supports 2, which carry the conditioner unit 4, is formed to include a lower horizontal tubular cylindrical bearing portion 29 and an upper horizontal tubular cylindrical portion 30 which are joined by an intermediate portion 200 provided with a longitudinal split or kerf 201 which intersects the tubular portions. The split in each intermediate portion forms a pair of portions and, as depicted in FIGURES 3 and 4, a pair of screws 31 are preferably carried by one of these portions for connection with the other portion in a manner whereby the tubular portions 29 and 30 can be readily contracted or expanded. It will be noted that the intermediate portion of each support is disposed at an angle with reference to the horizontal in order to place the upper tubular portions 30 in offset positions with respect to the lower tubular portions and that the screws 31 are respectively located adjacent the tubular portions to more or less obtain a selective control or adjustment for each.

The conditioner 4 and mode of mounting it on the supports 2 will now be described. Tubular bearings 32 and 33 are detachably clamped or held in the lower tubular portions 29 of the supports 2 as depicted in FIGURES 2 and 3. An elongated shaft 34 is journalled in the bearings with one end of the shaft projecting outwardly beyond the bearing 32 and side of the stand and a grooved wheel 35 is attached thereto by a set screw 36 extending through a hub of the wheel into the shaft. The hub engages the bearing 32 and limits movement of the shaft in one axial direction.

As shown particularly in FIGURE 2, a tubular mounting sleeve or mandrel 37 surrounds the shaft 34 and includes an enlargement forming a head 38 at one end and an elongated cylindrical portion provided with exterior threads 39 at its other end. A set screw 40 extends through the head into the shaft for keying the sleeve for movement therewith and for limiting axial movement of the shaft and sleeve in axial direction opposite to that resulting from the engagement of the hub of the wheel with the bearing 32. End plate bearings 41 surround the shaft and are respectively interposed between the ends of the sleeve 37 and the bearings 32 and 33. A nut 42 connects with the threads 39 on the sleeve for firmly clamping a plurality of corresponding product conditioner tool elements 43 on the sleeve against rotation between the head and nut.

The elements may be designed and constructed in various ways but as exemplified, particularly in FIGURES 2 and 10, each element is preferably made in the form of a disc blade having a hub and a circumferential portion tapered in cross-section. The periphery of the circumferential portion is preferably provided with radial teeth or serrations 44, with radial tapered concavities 45 therebetween. The ends of the teeth are generally square, accurately sharpened and tempered to promote penetration or cutting of the product. The character of the peripheries may be modified to obtain different results in conditioning different products. In other words, the character of the element used will primarily be dependent on the kind of product to be conditioned or treated. There is a very definite advantage in having the knives serrated as this causes small knife-like edges to strike the product intermittently and thereby penetrate the surface of the product more easily than a smooth edged knife which would have no impact against the product as compared with a serrated cutting edge.

Means preferably in the form of spacers 46 are carried by the sleeve 37 and interposed between the blade elements for maintaining the elements in predetermined spaced axial relationship. It is to be understood that if found desirable, the thicknesses and diameters of the spacers may be varied and that the hubs of the elements may be thickened or varied for abutment against one another to obtain predetermined spacings between the peripheries of the elements without utilizing separate spacers. In some instances, the diameters of the means employed to achieve spacings may be such that they will serve to prevent wedging of products between the elements, in which event, a depending portion of the guide 6 may be omitted.

The supports 2 are stabilized by a cross-bar 47 having its ends clamped in the upper tubular portions 30 of the supports. This bar is preferably flattened along its top side and the guide 6 is detachably secured thereto by screws 48 which extend through slots 49 in the guide and into the bar. This guide may be designed and constructed as desired but as best depicted in FIGURES 4, 5 and 7, includes a horizontal portion 50 provided with the slots 49, an inclined portion 51, a depending vertical portion 52, and a lower offset flange portion 53 constituting a continuation and reenforcement of the vertical portion. The inclined portion 51 has outturned generally triangular end walls 54 which extend alongside the lower extremity of the hopper 11 and the depending portion 52 extends between the conditioner 4 and roller 5 and is provided with a plurality of corresponding vertical openings or slots 55 through which the elements 43 project. The slots are of a size to provide sufficient clearance for the elements.

With the above described setup, vertical corresponding parallel portions of the guide are interposed between the elements which, among other things, serve to strip products from the elements and maintain them in a clean condition by preventing any of the products to be conditioned from receding and/or packing between the elements. Moreover, attention is directed to the important fact that since those portions of the elements which project through the openings in the guides are tapered in cross-section they tend to prevent accumulation of the products or portions thereof between the blades. In other words, the opposed faces of the elements extending through the slots are arranged in a diverging relationship to prevent compaction.

Of further importance is the fact that the teeth on the blades are of such a character that they generally puncture, nick, slit or pierce the cover of each product in a plurality of locations as the product is directed between the conditioner and the roller. The teeth, in penetrating or biting into the covers of the products, afford traction assisting in turning, rolling and/or urging the products between the conditioner and roller as they tumble downwardly thereto from the hopper. As will be pointed out subsequently, the conditioner and roller are preferably rotated in opposite directions, with the former being preferably rotated at a slower rate of speed than the feed roller.

The slots 49 in the horizontal portion 50 of the guide 6 and the screws 48 serve to provide an arrangement whereby the guide may, within practicable limits, be adjusted and firmly secured in any predetermined operative relationship with respect to the elements 43. This feature is important because in some instances the size or character of the product to be conditioned may determine the extent or distances that the elements project through the slots 55 to obtain the results desired. In other words, the guide may be adjusted to gauge the extent or amount of conditioning to be imparted to the products.

The feed roller 5 and mode of mounting same will now be described. The pair of supports 3 affording a mounting for the feed roller substantially correspond in design and construction to the pair of supports 2, and therefore, a detailed description of the supports 3 is not considered necessary. As shown, particularly in FIGURES 2, 3 and 5, a pair of tubular bearings 56 are clamped in the lower tubular portions of supports 3 in the same manner that the tubular bearings 32 and 33 are clamped in the lower portions 29 of the supports 2. An elongated horizontal shaft 57 is journalled in the bearings 56 in parallel and horizontal relationship to the shaft 34 carrying the conditioner 4. One end of the shaft 57 extends outwardly from the stand and a grooved wheel 58 is preferably secured thereto by a set screw 59 which is carried by the hub of the wheel and extends into the shaft. This wheel is somewhat larger in diameter than the wheel 35 carried by the shaft 34 and preferably located outwardly from the wheel 35.

An inner sleeve or mandrel 60 is mounted on the shaft 57 and includes a cylindrical wall disposed in concentric spaced relationship with respect to the shaft and a pair of end walls provided with holes therein through which the shaft extends. A set screw 61 is carried by one of the end walls and projects into a hole provided therefor in the shaft for fastening the sleeve thereto. End plate bearings 62 are preferably interposed between the ends of the sleeve and the bearings 56 in which the shaft 57 is journalled. A tubular outer sleeve 63, preferably of a non-metallic character, and constructed of some desirable resiliently flexible material such as rubber or a suitable plastic, is permanently bonded or otherwise secured to the inner sleve. The peripheral surface of the outer sleeve is preferably interrupted by a plurality of longitudinally extending corrugations, serrations or other suitable surfaces or formations 203 so as to provide a plurality of friction or traction surfaces which assist in resiliently rolling and directing the products between the roller and conditioner and at the same time ease the product into the teeth 44 or cutting edges of the elements. For example, as shown in FIGURE 11, the roller is provided with traverse exterior grooves which receive the peripheries of elements so that the products will be severed or cut into sections or parts as distinguished from being merely nicked or penetrated. If desired, a guide like 6 can be mounted so that slots in a depending portion thereof receive the elements. This operative relationship between a resilient feed roller and the elements is an important one and affords a smooth and positive penetrating or cutting action of the products without causing any adverse shock or vibration to the elements and associated components. The cutting or penetrating action of the blade elements has proven very efficient and particularly on products having covers in the form of rinds, shells or skins which are thin, rubbery or resilient as well as those which are relatively thick, hard or brittle.

A cross-bar 64 has its ends clamped in the upper tubular portions of the supports 3 and the guide 7 is detachably and adjustably secured to the flattened top side of the cross-bar by screws in substantially the same manner that the guide 6 is mounted for adjustment on the cross-bar 47. The guide 7, as best illustrated in FIGURES 1, 5 and 8, preferably includes a horizontal portion 65 provided with slots for screws, an inclined portion 66, and a pair of depending end walls 67 extending from the inclined wall alongside the hopper 11 and in straddling relation to the ends of the guide 6. More specifically in this repsect, the end walls 67 overlap the end walls 54 of the guide 6 sufficiently to always maintain the guides in a nested or straddling relationship whenever the guides are adjusted with respect to one another. It should be noted that the end walls 67 of the guide 7 extend appreciable distances downwardly alongside the depending portion 52 of the guide 6 in order to prevent the escape of products in generally outward axial directions from the throat or passage defined by the conditioner and roller. The end walls of the guides may be in the form of integral offsets as shown or as separate members welded or otherwise secured in place.

With the above described organization, the inclined portions and end walls of the guides complement one another to define a generally V-shaped formation or secondary hopper with the lower edges of such portions or walls defining an opening 68, as depicted in FIGURE 5, the size of which can be readily varied by adjusting the guides on the cross-bars, the pairs of supports 2 and 3, or both. It will be noted that the secondary hopper formed by the guides receives the lower extremity of the primary hopper 11 as shown in FIGURE 5 and that the opening 68 is located in close proximity to the relatively narrow generally V-shaped passage or throat defined by the conditioner and roller. In other words, the guides direct the flow or travel of the products to a location where the conditioner and roller substantially directly take over and carry them therebetween and subsequently to the chute 12. The size of the opening 68 serves to control or regulate the flow of the products to the conditioner and roller and thereby assists in preventing the products from becoming clogged, crushed or bruised while being subjected to the condtioner.

As set forth above, one of the important objects of the invention is to provide novel means whereby to facilitate relative adjustment between the conditioner and the feed roller. The means preferably employed for this purpose, as clearly exemplified in FIGURES 1, 2 and 3, includes studs 69 respectively secured to the lower tubular portions of the pairs of supports 2 and 3 by screws 70. Biasing or resilient means, preferably in the form of helical springs 71 have their ends respectively receiving the opposed aligned pairs of studs for normally urging the conditioner and feed roller away from one another in parallel relation when the bolts 27 holding the supports on the tracks 25 are sufficiently loosened. Obviously, when the supports are firmly locked in place by the bolts after adjustment the helical springs do not serve any useful purpose.

As depicted in FIGURE 2, the opposite ends of each of the tarcks 25 on which the supports 2 and 3 are mounted are provided with pairs of upstanding internally threaded lugs 72 and 73. The lugs may be secured to the tracks or if desired, may be directly anchored to the upper side rails 17 and 19 of the stand. Screws 74 are respectively carried by the pair of lugs 72 so that their inner ends may engage the base portions of the pairs of supports 3. The outer ends of the screws are preferably provided wtih offsets which serve as handles to facilitate manipulation of the screws and lock nuts are carried by the screws for engagement with the lugs for locking the screws in place after the supports 3 have been adjusted on the tracks. Screws 75 cooperate with threaded apertures in the lugs 73 so their inner ends will engage the base portions of the supports 2. Sprockets 76 are respectively fixed on the screws 75 and a chain 77 is carried by the sprockets. A set screw 78, preferably of nylon, is carried by each of the lugs 73 for engaging and locking the screws 75 in place after adjustment. With this unique orgnazation of components the conditioner may be adjusted in parallel distal relation with respect to the feed roller by merely manipulating either of the screws 75.

More particularly in this regard, when the bolts 27 securing the supports 2 to the tracks are loosened sufficiently the helical springs 71 will automatically cause the supports to resiliently bear against the screws 75 so that by merely manipulating either screw both screws will be jointly operated to simultaneously actuate or slide the supports on the tracks 25 to vary the position of the conditioner with respect to the roller. After the conditioner is adjusted to a desired position the bolts are tightened by the nuts 28 extending appreciable distances therebelow to lock the supports 2 firmly in place. The supports 3 and roller are readily lockable in place with respect to the conditioner in substantially the same manner that the supports 2 and conditioner are lockable on the tracks 25.

In order to assist in determining the extent or measure of relative adjustment desired or required between the conditioner unit and roller unit one of each of the supports 2 and 3 is preferably provided with a plate 79. These plates are preferably secured to the inner ends of the base portions of the supports by screws as best shown in FIGURES 2 and 3. Each plate is provided with a vertical edge 80. These edges are preferably juxtaposed in exact parallel relationship to one another and serve to gauge or determine the relative distal relationship between the units. With this setup, the distance between the edges of the gauge plates may be set so that the units will efficiently condition one form or kind of product or set to any one of a plurality of other positions so that the units will condition a different kind of product. Although not absolutely essential, the distance between the vertical edges 80 of the gauge plates preferably corresponds to the distance between the peripheries of the units so that the distance between the latter is readily ascertained by merely measuring the distance between the plates. If found desirable, the plates may be provided with suitable indicia to indicate what the settings should be to obtain the desired penetration for different products.

Various means may be employed to operate the conditioner unit and roller unit but as exemplified in FIGURES 1 and 4, this is preferably accomplished by the power units 8 and 9 in the form of electric motors. The motor 8 is preferably of a higher rated horsepower than the motor 9 and includes a shaft provided with a grooved pulley 81. This pulley is operatively connected by a belt 82 to the small wheel 35 on the shaft 34 which carries the conditioner. The shaft of the motor 9 is similarly provided with a pulley 83 operatively connected by a belt 84 to the large wheel 58 on the shaft 57 carrying the roller. With this novel arrangement the units are rotated in opposite directions as indicated by the arrows in FIGURE 1 to cause the products to travel therebetween.

In the particular hookup shown the roller is rotated at a somewhat lower rate of speed such as 530 r.p.m. whereas the conditioner preferably rotates at a higher rate, such as 1530 r.p.m. in order to insure an efficient delivery and cutting of the products by the blades 43. More particularly in this regard, the slower rotation of the roller serves to stabilize the positions of the products for proper conditioning or treatment as they are carried between the conditioner and roller. However, it is to be understood that if found desirable in some applications the roller may be rotated at the same or a higher speed than the conditioner.

The motors 8 and 9 may be mounted on the stand in any manner desired, but as shown in FIGURE 1, they are respectively mounted on bases 85 and 86. The base 85 is welded or otherwise secured to the upper side rail 19, end rail 21 and a cross brace 87, the latter of which lends rigidity to the upper side rails intermediate their lengths. The base 85 is preferably provided with slots 88 and the motor with apertured ears. Bolts 89 extend through the slots and the apertures in the ears for adjusting the location of the motor on the base to tighten the belt 82. The base 86 for the motor 9 is preferably anchored to the upper side rail 19 and end rail 23 and holes are provided in the side rail and base through which bolts extend into slots in the base of the motor for adjusting the motor for tightening the belt 84 on the pulley 83 and large wheel 58.

The cover 10 and hopper 11 will now be described. These components may be designed and constructed in various ways but as illustrated in FIGURES 1, 4 and 6, the hopper is carried by the cover. More specifically, the cover is rectangular in shape and includes a pair of side walls 90 which extend alongside the machine, end walls 91 and a separate top wall 92 joined to the side and end walls. The end walls are provided with attaching members 93 having holes therein for receiving screws 94 which connect with the upper end rails 21 and 23 of the stand for detachably securing the cover thereto to protect the movable parts of the machine and prevent an operator from contacting such parts. Handles 95 are also secured to the end walls of the cover above the attaching members to facilitate manipulation of the cover.

The top wall 92 of the cover is provided with a flanged rectangular opening 96. The upper part of the hopper is rectangular and includes side walls 97 and end walls 98. This upper part of the hopper is preferably secured in the flanged opening by welding. The lower part of the hopper includes generally triangular parallel side walls 99 and rectangular converging end walls 100. The lower marginal edge portions of these walls define an outlet opening 101 through which the products fall into the secondary hopper formed by the guides 6 and 7 alluded to above. The lower part of the hopper 11 extends into the cover with its lower end and is disposed in the secondary hopper and the upper part of the hopper extends primarily above the top wall of the cover.

A grating assembly 102, clearly shown in FIGURES 1 and 4, is preferably secured in the upper rectangular part of the hopper so as to prevent an operator from accidental injury by engaging the rotatable units. The grating unit includes a frame secured within the hopper by any suitable means, such as rivets, with cross-members secured to the frame transverse to the length of the machine.

The chute 12 and mode of attaching same to the stand will now be described. The chute may be constructed as desired but as shown in FIGURES 1 through 4 and 9 of the drawing is designed and constructed for disposition in the stand so that its upper extremity extends upwardly above the upper side and end rails of the stand in a protective surrounding relationship to the conditioner and roller units and so that the conditioned products will be confined for discharge downwardly into a receptacle or onto a conveyor adapted to be placed below the chute.

The chute 12 is rectangular in shape, open ended and includes a pair of corresponding planar side walls 103 and a pair of corresponding planar end walls 104 having flanges secured to the inner surfaces of the side walls as best depicted in FIGURE 9. The walls are of the same length and the upper portions of the side walls 103 are preferably provided with clearance notches 105 for the ends of the conditioner and roller units. The chute is preferably detachably connected to the stand through the agency of a plurality of snap-connection means. More particularly in this respect, channel members 106 are secured to the lower portions of the side walls and a pair of yieldable fingers 107 are attached to each of the channel members in upstanding spaced relation to the side walls for receiving therebetween the lower side rails 18 and 20 of the stand as shown in FIGURE 4. The fingers are provided with apertures 108 which selectively receive four lateral rounded projections 109 on the lower side rails to afford a convenient type of snap-connection for detachably mounting the chute on the stand. As clearly exemplified in FIGURES 1, 3 and 4, the notches in the side walls of the chute afford clearance so that these walls extend upwardly in straddling relationship to the ends of the conditioner and roller and the end walls extend upwardly above the upper side rails and alongside the conditioner and roller so that the conditioning or treatment of the product is performed substantially within the confines of the chute.

In view of the foregoing description it will be manifest that when products such as those exemplified in FIGURE 5 are deposited in the primary hopper they will be separated and distributed to some extent by the grating assembly 102 and fall into the secondary hopper and through the outlet 68 where they are subjected to the rotating roller and blade elements so that the covers of the products are penetrated, punctured or nicked at a plurality of spaced locations as shown. It will be noted the setup is preferably such that the products pass between the roller and the depending or vertical portion 52 of the guide 6 a relatively short distance in order to more or less distribute and stabilize the positions of the products in a row immediately prior to and during the penetrating or cutting action of the blade elements. This unique arrangement funnels the products into proper position for conditioning and substantially prevents bouncing of the products as they are more or less confined and while confined they are picked up by the corrugations on the roller and the teeth on the elements and rolled or rotated between the roller and elements in passing therebetween. The teeth or serrations assist in directing, pulling or drawing the products between the units and in some instances a row of spaced nicks or cuts will be made on one product—in some instances two or more rows. In other words, the number and character of the cuts and number of rows will depend on the size of the product, character of the teeth and axial spacing of the blades. The capacity of the machine is large and in use has proven very efficient in performing the operation required.

Having thus described our invention, it is obvious that various modifications may be made in the same without departing from the spirit of the invention, and, therefore, we do not wish to be understood as limiting ourselves to the exact forms, constructions, arrangements, and combinations of parts herein shown and described.

We claim:

1. A machine of the kind described comprising: a frame provided with a pair of side rails, a first pair of supports respectively mounted in opposed relationship on the side rails and a second pair similarly mounted on the rails in longitudinally spaced relationship to the first pair, each of said supports comprising a lower enlargement, an upper enlargement and a connecting portion, each of said enlargements being provided with an opening and each of said connecting portions being provided with a slot intersecting the openings, a bearing disposed in each of the openings provided in the lower enlargements, a first shaft having ends respectively journalled in the bearings carried by the first pair of supports, a plurality of disc-like blades carried by the shaft, a second shaft having ends respectively journalled in the bearings carried by the second pair of supports, a resilient member carried by the second shaft and provided with a serrated exterior surface disposed opposite the peripheral edges of the blades assisting to feed a food product therebetween, a first bar disposed in the openings provided in the upper enlargements of the first pair of supports and a second bar disposed in the openings provided in the upper enlargements of the second pair of supports, means carried by the connecting portions of the supports for simultaneously clamping or unclamping the bearings and bars in the openings, guides respectively carried by the bars for directing a product between the blades and the resilient member, and means for rotating the shafts.

2. A machine for processing peas and the like comprising a first shaft having thereon a plurality of cutting blades, a second shaft parallel to said first shaft, said second shaft having thereon a resilient roller, and a pair of upwardly diverging guide chutes having lower terminal portions disposed respectively immediately above said cutting blades and said roller, the guide chute above said cutting blades having attached to its lower terminal portion a plurality of stripper members extending between said cutting blades.

3. A machine for processing a product, such as peas, said machine comprising a shaft having thereon a plurality of cutting blades and a roller parallel to said shaft and provided with a resilient bearing surface, a hopper provided with a discharge opening, and a pair of upwardly diverging guides having lower terminal portions defining an outlet disposed directly below said opening and immediately above said blades and roller for controlling the flow of the product thereto, the lower terminal portion of said guide above said blades having a plurality of stripper members extending between said blades.

4. The machine defined in claim 3, including means for rotating the shaft at one speed and means for rotating the roller at a slower rate than the shaft.

5. A machine for processing a product, said machine comprising a frame, two pairs of supporting means adjustable on said frame, a shaft mounted on one pair of supporting means and having thereon a plurality of cutting blades, a roller mounted on the other pair of supporting means in parallel relation to the shaft and provided with a resilient surface, guide means comprising a pair of upwardly diverging walls having lower terminal portions respectively disposed immediately above said blades and roller and defining an outlet through which the product may flow downwardly in a path substantially perpendicular to a line intersecting the axes of said shaft and roller, and the lower terminal portion above said blades being provided with a plurality of stripper members extending between said blades.

6. The machine defined in claim 5, including a pair of members respectively carried by certain of said supporting means and having opposed edges for gauging the distance between the blades and roller.

7. A machine for processing a food product, said machine comprising a frame, a pair of horizontal parallel bars supported above said frame, a rotatable shaft mounted on said frame and provided with a plurality of spaced cutting blades for slitting the product, a roller mounted on the frame in parallel relation to said shaft and provided with a resilient bearing surface, and a pair of upwardly diverging guides respectively carried by said bars and having lower portions respectively terminating immediately above said blades and said roller, the guide above said blades having a plurality of stripper members extending from its lower portion into the spaces between said blades.

8. The machine defined in claim 7, including a chute carried by said frame and substantially surrounding said shaft and blades thereon and said roller.

9. A machine for processing a food product, said machine comprising a frame, two pair of supporting means carried by said frame, a shaft journalled on one pair of supporting means, a plurality of cutting blades on said shaft, a roller journalled on the other pair of supporting means in parallel relation to the shaft and having thereon a resilient surface, a pair of bars respectively carried by said pairs of supporting means and disposed above the axes of said shaft and roller, upwardly diverging guides mounted on said bars and having lower terminal portions respectively disposed immediately above said blades and roller, the terminal portion of the guide above said blades having a plurality of stripper members extending into the spaces between said cutting blades, and means for rotating the shaft and roller.

10. The machine defined in claim 9, including rails on the frame upon which the supporting means are carried, and means for securing the supporting means to the rails having elongated nuts extending appreciably below the rails for convenient manipulation.

11. The machine defined in claim 9, including means carried by the supporting means and common to said shaft and roller for detachably securing the same to said supporting means.

12. The machine defined in claim 9, including a chute carried by said frame and substantially surrounding said shaft and blades thereon and said roller.

13. A machine for processing peas and the like comprising a first shaft having thereon a plurality of cutting blades, a second shaft parallel to said first shaft, said second shaft having thereon a feed roller, and a pair of upwardly diverging guide chutes having lower terminal portions disposed respectively immediately above said cutting blades and said roller, the guide chute above said cutting blades having attached to its lower terminal portion a plurality of members extending between said cutting blades for gauging the depth of the cut and stripping the product therefrom.

14. A machine for processing a food product, said machine comprising a frame, a pair of parallel bars supported above said frame in a substantially horizontal plane, a rotatable shaft mounted on said frame and provided with a plurality of spaced cutting blades for slitting the product, a roller mounted on the frame in parallel relation to said shaft and provided with a bearing surface, a pair of upwardly diverging guides respectively carried by said bars and having lower portions respectively terminating immediately above said blades and said roller, the guide above said blades having a plurality of members extending from its lower portion into the spaces between said blades for gauging the depth of the cut and stripping the product from said blades, and means for adjusting the guides relative to the bars and the bars relative to the frame.

15. A machine for processing a food product, said machine comprising a frame, a pair of parallel bars supported above said frame in a substantially horizontal plane, a rotatable shaft mounted on said frame and provided with a plurality of spaced cutting blades, a roller mounted on the frame in parallel relation to said shaft and provided with a bearing surface, a pair of upwardly diverging guides respectively carried by said bars and having lower portions respectively terminating immediately above said blades and said roller, the guide above said blades having a plurality of members extending from its lower portion into the spaces between said blades for gauging the depth of the cut and stripping the product from said blades, and means for adjusting the guides relative to the bars and the bars relative to the frame.

References Cited in the file of this patent

UNITED STATES PATENTS

| Number | Name | Date |
|---|---|---|
| 376,712 | Gathmann | Jan. 17, 1888 |
| 1,509,204 | Harrison | Sept. 23, 1924 |
| 1,577,382 | Straub | Mar. 16, 1926 |
| 1,626,361 | Schmitt | Apr. 26, 1927 |
| 1,671,356 | Diederichs | May 29, 1928 |
| 1,709,018 | Howson | Apr. 16, 1929 |
| 1,729,611 | Forrest | Oct. 1, 1929 |
| 1,834,347 | Nixon | Dec. 1, 1931 |
| 1,947,011 | Karthauser | Feb. 13, 1934 |
| 2,182,131 | Maede | Dec. 15, 1939 |
| 2,235,968 | Thurman | Mar. 25, 1941 |
| 2,258,516 | Richardson | Oct. 7, 1941 |
| 2,302,701 | Lang | Nov. 24, 1942 |
| 2,326,407 | Steinwand | Aug. 10, 1943 |
| 2,465,670 | Urschel et al. | Mar. 29, 1949 |
| 2,497,038 | Spang | Feb. 7, 1950 |
| 2,518,562 | Moree et al. | Aug. 15, 1950 |
| 2,527,695 | Bennett | Oct. 31, 1950 |
| 2,543,932 | Polk et al. | Mar. 6, 1951 |
| 2,598,548 | Jackson | May 27, 1952 |
| 2,721,666 | Mohrs et al. | Oct. 25, 1955 |
| 2,728,470 | Peterson | Dec. 27, 1955 |